United States Patent

Teterevyatnikov

[11] 4,244,231
[45] Jan. 13, 1981

[54] METHOD FOR MEASURING MASS FLOW OF A SUBSTANCE

[76] Inventor: Lev N. Teterevyatnikov, ulitsa Musorgskogo, 1, kv. 216, Moscow, U.S.S.R.

[21] Appl. No.: 17,105

[22] Filed: Mar. 5, 1979

[51] Int. Cl.³ .............................................. G01F 1/34
[52] U.S. Cl. ................................................ 73/861.42
[58] Field of Search ............ 73/194 R, 194 M, 205 R, 73/205 D

[56] References Cited

U.S. PATENT DOCUMENTS

| | | | |
|---|---|---|---|
| 3,102,423 | 9/1963 | Prindle | 73/205 |
| 3,705,534 | 12/1972 | Turek | 73/194 |
| 3,709,213 | 1/1973 | Yard | 73/194 R |

Primary Examiner—Herbert Goldstein
Attorney, Agent, or Firm—Holman & Stern

[57] ABSTRACT

A method for measuring mass flow of a substance based on the differential pressure between two points of the measured flow, consisting in that an auxiliary flow of the substance is provided intersecting the measured flow and the auxiliary flow is channelled out from the zone of intersection. The differential pressure is measured between two points of the measured flow, located upstream and downstream the intersection with the auxiliary flow, the parameters of the auxiliary flow being determined by pre-set conditions.

1 Claim, 2 Drawing Figures

METHOD FOR MEASURING MASS FLOW OF A SUBSTANCE

The invention relates to the measuring instruments, and in particular, to a method for measuring mass flow of a substance.

FIELD OF THE INVENTION

The invention may be used for determining mass flow of fluid substances.

BACKGROUND OF THE INVENTION

Known in the art is a method for measuring mass flow of a substance based on the differential pressure across on orifice plate (diaphragm) installed in a pipeline in which the substance flow is measured, and on the density of the substance which to be measured (cf. V. G. Tseitlin. Techniques for Measuring Flow and Quantity of Liquids, Gases and Vapours (in Russian). 1968, pp. 27—40).

The need to measure the density of a substance complicates the method for determining the flow rate and lowers the accuracy, while the range of measured flow rates is restricted as there is a square relationship between the pressure difference and substance flow.

Known in the art is a method for measuring the flow rate of a substance by providing an auxiliary flow thereof in the form of a jet emerging in the direction at a right angle to the measured flow and intersecting a part of the cross-section of the measured flow. The differential pressure is measured at the points of the measured flow located opposite to the orifice from which the jet emerges, in the zone of influence of the jet (cf. P. P. Kremlevsky. Flow Meters and Quantity Counters (in Russian). 1975, pp. 645, 646).

This method also has a restricted range of measured flow rates of substance. In addition, either the velocity of measured flow or mass flow with known and constant density of substance in the flow can only be determined by this method. Measuring of mass flow of a substance with variable density, as in flow meters equipped with membranes, involves measuring the density too.

Known in the art is also a method for measuring mass flow of a substance based on the differential pressure between two points of the flow being measured, the pressure being created in a pipeline in the zone of a cylinder rotating at a constant speed and partially obstructing the measured flow. The rotating cylinder provides an auxiliary flow in the form of a part of the measured flow which rotates together with the cylinder (cf. FRG patent No. 1046350, Cl. 42e, 23/20). The differential pressure measured by this method is directly associated with the mass flow of a substance thus eliminating the need to measure its density. The differential pressure is proportional to the mass flow, hence, there are no limitations of the measurement range due to the square relationship of mass flow of a substance versus differential pressure in the flow.

There are, however, restrictions of the measurement range associated with the need in the interaction of boundary layers adjacent the relatively moving parts of a flow meter (in this case, rotating cylinder and flow meter body), thus resulting in rather small effective cross-sectional areas of flow meters.

Accuracy of measurement of the flow of a substance largely depends on the structure of the flow being measured as the points of pressure pick-up are located in the zone of interaction of measured and auxiliary flows during the measurement.

A change in structure of the measured flow may result in changes in or fluctuations of the differential pressure with unchanged flow rate of substance thus introducing an additional measurement error.

SUMMARY OF THE INVENTION

It is an object of the invention to further enlarge the range of measured mass flows of a substance and improve the measurement accuracy.

This object is achieved by a method for measuring mass flow of a substance based on the differential pressure between two points in the measured flow of a substance by providing an auxiliary flow of the substance. According to the invention, the measured flow is intersected by an auxiliary flow which is channelled out from the intersection zone, and the differential pressure in the measured flow is measured between the points thereof located upstream and downstream of the intersection with the auxiliary flow, the parameters of the auxiliary flow being determined only by the following conditions:

$$V > (H/h) \, V; \; b \geq B,$$

wherein $H$ and $h$ are the cross-sectional dimensions of the measured and auxiliary flow, respectively, in the plane of intersection of the flow directions in the zone of their intersection;

$B$ and $b$ are the cross-sectional dimensions of the measured and auxiliary flow, respectively, in the zone of their intersection as measured in the direction at a right angle to said plane;

$v$ is the average velocity of the auxiliary flow in the zone of intersection of flows in the plane of intersection of the flow directions;

$V$ is the average velocity of the measured flow in the zone of intersection of flows at maximum measured flow of the substance.

BRIEF DESCRIPTION OF THE DRAWINGS

The invention will now be described in detail with reference to a specific embodiment thereof illustrated in the accompanying drawings, in which.

DETAILED DESCRIPTION OF THE INVENTION

Figure 1:
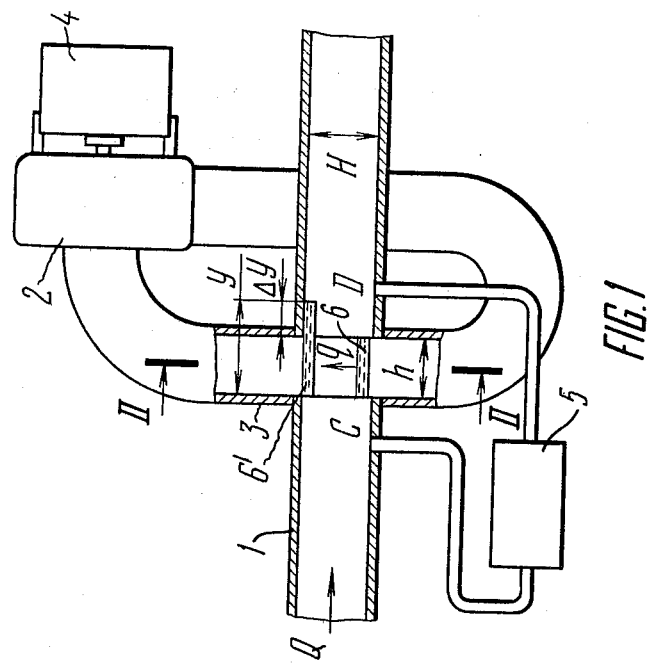
FIG. 1 shows an embodiment of an apparatus for carrying out the method for measuring the mass flow of a substance, according to the invention.

The method according to the invention may be implemented by using a device shown in FIG. 1, comprising a straight pipeline 1 in which the measured flow of a substance flows, a pump 2 for feeding an auxiliary flow of the same substance. The pump 2 is installed in an annular pipeline 3. The annular pipeline 3 is connected at a right angle to the straight pipeline 1. The pump 2 is driven by an electric motor 4 and has a constant volumetric output. A differential pressure gauge 5 is connected to points C and D of the straight pipeline 1, which are located upstream and downstream the intersection thereof with the annular pipeline 3, and is designed to measure the mass flow of a substance from the differential pressure.

In the device of FIG. 1, the direction of measured flow of a substance is designated by an arrow Q, and the direction of the auxiliary flow is designated by a vertical arrow q, the plane of intersection of the directions Q and q of the flows coinciding with the plane of FIG. 1. An elementary particle of the auxiliary flow at the inlet to the measured flow is shown at 6, and an elementary particle of the same auxiliary flow at the outlet from the measured flow is shown at 6'.

H and h are the cross-sectional dimensions of the measured and auxiliary flow, respectively, in the plane of intersection of the directions Q and q of flows in the zone of flow intersection extending between the inlet of the straight pipeline 1 to and its outlet from the annular pipeline 3.

Figure 2:
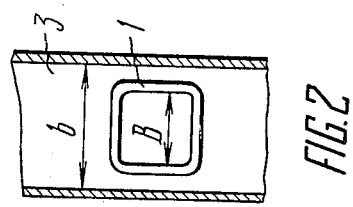
FIG. 2 is a sectional view taken along the line II—II in FIG. 1, according to the invention.

FIG. 2 shows a sectional view taken along the line II—II in FIG. 1, that is in the plane extending at right angle to the direction Q of the measured flow. B and b in FIG. 2 are the cross-sectional dimensions of the measured and auxiliary flows in the zone of intersection of the flows as measured in the direction at right angle to the plane of intersection of the directions Q and q of the flows (FIG. 1). The dimensions H,h,B and b (FIG. 2) define the sizes of the measured and auxiliary flows, respectively, and the inequality b≧B should be complied with. This is one of the conditions for complete intersection of the measured and auxiliary flows.

The measured flow moves along the straight pipeline 1, and the auxiliary flow provided by the pump 2 moves in the annular pipeline 3.

As a result of intersection of the measured and auxiliary flows a resistance is offered to the movement of the measured flow.

This resistance is due to the inertia of particles of the auxiliary flow moving between parts of the measured flow.

It should be noted that between parts of the measured flow there are permanently present particles of the auxiliary flow that have no velocity in the direction Q (FIG. 1) of the measured flow and that are caused to move in this direction only after they get between said parts of the measured flow. This movement is ensured owing to the fact that the parts of the auxiliary flow, after intersecting the measured flow, are channelled out from the zone of their interaction as the auxiliary flow circulates in the annular pipeline 3.

The relationship of the differential pressure ΔP versus mass flow of a substance is determined as follows.

Any elementary particle 6 in the auxiliary flow having, at the entrance to the zone between the parts of the straight pipeline 1, a length "y" (FIG. 1), which is equal to the dimension h of the auxiliary flow, is subjected, after passing through the measured flow, to the action of a differential pressure $$\Delta P = P_1 - P_2,$$

wherein $P_1$ and $P_2$ are pressure values of a substance upstream and downstream of the intersection of the flows, respectively. At the end of movement in the measured flow, that is at the outlet of the auxiliary flow from the zone between the parts of the straight pipeline 1, the length of the elementary particle 6', which is under the action of the differential pressure ΔP, becomes equal to "y" as a result of its travel in the direction of the measured flow and replenishment thereof from the measured flow. It should be noted that a part of the elementary particle 6' at the outlet of said zone, having a length $\Delta y = y - y_o$, actually gets in the straight pipeline 1. It is these parts of the auxiliary flow that make up the whole measured flow after intersecting it, thereby ensuring the complete intersection of the measured and auxiliary flows.

With $y_o > y$ (which is possible in any case by respectively selecting the ratio of velocities and cross-sectional areas of the measured and auxiliary flows) there is a relationship:

$$\Delta y \, \rho = Pt^2/2y_o \tag{1}$$

wherein ρ is the density of substance in the flow, t is the time of movement of the elementary particle 6 in the zone of intersection of the flows (see L. N. Teterevyatnikov. Apparatus for Measuring Flow and Quantity of Gaseous Condensate (in Russian). "Izmeritelnaya mekhanika". 1978, No. 4).

Assuming the cross-sectional dimension of the measured flow in the plane of intersection of the flow directions Q and q to be equal to H, obtain by transforming the formula (1):

$$\Delta y B \rho (H/t) = \Delta P (HBt/2h).$$

The value ΔyBρH/t is the mass flow $Q_M$ of a substance in the straight pipeline 1. As the values t, H, B and h are constant by definition, $$\Delta P = (2h/tBh)Q_M \tag{2}$$

In measuring the mass flow $Q_M$ from the differential pressure Δ P the differential pressure Δ P is preferably proportional to the mass flow. To ensure this, it is necessary to have t=const., hence the velocity of the auxiliary flow should remain constant.

The method may also be used with varying velocity of the auxiliary flow. Thus, it may prove expedient to control velocity of the auxiliary flow using a signal from the differential pressure gauge 5 by feeding this signal to the electric motor 4 or any other suitable controller of the substance flow rate, available in the annular pipeline 3. The value of t is thus varied, which may be used for further enlarging the range of linear relationship of the differential pressure Δ P versus mass flow $Q_M$, that is for enlarging the measurement range.

The indispensable condition for complete intersection of the measured and auxiliary flows, in addition to the above-mentioned condition b>B, is the compliance with the relationship $$v > H/h \, V \tag{3}$$

wherein v is the average velocity of the auxiliary flow in the plane of intersection of the flow directions Q and q in the zone of their intersection, and V is the average velocity of the measured flow in the same zone at maximum measured flow.

The ratio of mass flow of a substance $Q_M$ to the differential pressure ΔP obtained during the measurement of the mass flow of a substance by the method according to the invention does not depend on the interaction of the boundary layers of the parts of flow meters; it is linear and based on interaction of masses of the measured and auxiliary flows upon their intersection, thus ensuring a broad range of measured flow rates of a substance.

The pressure pick-up points are located outside the zone of interaction of the flows so that the influence of structure of the measured flow on the measurement accuracy is insignificant. The measurement accuracy is also improved owing to the linear relationship of mass flow versus the differential pressure thus eliminating an additional error from conversion of the output signal of the differential pressure gauge 5.

The realization of the method is structurally simple and reliable. The detailed elaboration of the theory of the method, including the equation interconnecting all basic parameters of the design, enables a simple calculation and design of device for carrying out the method according to the invention.

Apparatus for carrying out the method can be readily built from standard commercially available components (pumps, differential pressure gauges, pipelines).

The method enables the use of apparatus without any partitions in the path of flow thus lowering the probability of clogging of the measuring section and enabling an unobstructed passage of cleaning devices in the pipelins.

What is claimed is:

1. A method for measuring mass flow of a substance based on the differential pressure between two points of the flow of a substance being measured, comprising the steps of:

providing an auxiliary flow of the same substance, intersecting said measured substance;

channelling said auxiliary flow out from an intersection zone;

measuring said differential pressure between two points of said measured flow;

said measurement points being located upstream and downstream the intersection of said measured flow and said auxiliary flow;

the parameters of said auxiliary flow being selected based on the following conditions: $v > H/h \, V$, $b > B$, wherein H and h are the cross-sectional dimensions of said measured and auxiliary flow, respectively, as measured in the zone of their intersection in the plane of intersection of the flow directions;

B and b are the cross-sectional dimensions of said measured and auxiliary flows in said intersection zone as measured in the direction at right angle to said plane;

v is the average velocity of said auxiliary flow in the zone of intersection of flows in the plane of intersection of the flow directions;

V is the average velocity of said measured flow in the same said zone of intersection of the flows at maximum measured flow rate of a substance.

* * * * *